METHOD OF MANUFACTURING MAGNETIC HEADS

Filed Sept. 6, 1960 4 Sheets-Sheet 1

INVENTOR
Simon Duinker.
Jules Bos.
BY
AGENT

METHOD OF MANUFACTURING MAGNETIC HEADS

INVENTOR
Simon Duinker
Jules Bos.
BY
Frank R. Jifani
AGENT

INVENTOR
Simon Duinker
Jules Bos.
BY
Frank R. Trifari
AGENT

METHOD OF MANUFACTURING MAGNETIC HEADS

INVENTOR
Simon Duinker
Jules Bos.
BY
Frank R. Jifani
AGENT

3,187,410
METHOD OF MANUFACTURING MAGNETIC HEADS

Simon Duinker and Jules Bos, Eindhoven, Netherlands, assignors to North American Philips Company, Inc., New York, N.Y., a corporation of Delaware Filed Sept. 6, 1960, Ser. No. 54,157
Claims priority, application Netherlands, Sept. 5, 1959, 243,050
15 Claims. (Cl. 29—155.5)

This invention relates in general to a method of manufacturing poleshoe units of a magnetic recording or reproducing head, the units having an interposed connecting layer constituting the gap; the invention also relates to the insertion of the poleshoes in the magnetic head along which the magnetic record carrier is moved; the method comprises starting from at least two blocks of sintered, oxidic, ferromagnetic material, and machining accurately and arranged parallel to each other and opposite each other the portions of the blocks which are to be the gap surfaces, after which the blocks are united at these surfaces, there being interposed between the surfaces a layer of a bonding agent which determines the gap length. A method of this kind is known per se. The invention furthermore relates to such poleshoe units and to magnetic heads provided therewith. It is also known in the prior art to manufacture magnetic heads by applying a poleshoe piece including a useful gap to an open, magnetically weak closing piece provided with windings.

In order to mitigate the disadvantage of the low resistance to wear of magnetic heads consisting of laminated units of metallic, magnetic material a known method uses exchangeable pole pieces, these being composed of two units of poleshoe laminations including between them the useful gap determined by a spacing plate, the adherence of these units being ensured by fixation in a non-magnetic holder by using a cast resin. Apart from the disadvantage of the variation in physical properties of these magnetic heads due to wear, this method cannot be used for mass production owing to the many expensive operations required for shaping and mounting the holder and the pole pieces. Moreover, owing to the laminated structure and to spreading out of the poleshoe material in the gap when the running surface of the head is shaped and during subsequent use under normal operating conditions, it is difficult to obtain in this manner sharply defined, parallel useful gaps of for example a few microns in length; this difficulty is also aggravated by the fact that the various required grinding and polishing operations applied to the gap and the running surface deteriorate the magnetic properties of the material in the so-called machining layer down to a depth of one to two microns owing to stress in the material and deformations; these deteriorations can not be neutralized in the completed pole piece, for example by annealing, so that the physical, i.e. the effective useful gap obtained is considerably larger and less sharply defined than the optically observable gap, thus adversely affecting the resolving power of the magnetic head for short wavelengths. Attempts have been made to obviate the last-mentioned disadvantages—without satisfactory results—by using for the poleshoes more wear-resistant, metallic, magnetic materials; these, however, are extremely costly.

With another known method most of the aforesaid disadvantages are obviated by using sintered, oxidic, ferromagnetic core material, this material being inherently extremely resistant to wear and which, in contrast to metallic ferro-magnetic materials, exhibits an immeasurably small mechanical working layer; also the disadvantage of gap erosion owing to scaling which occurs in the use of separate spacing plates or layers to define the gap length is avoided by using a non-magnetic, fairly wear-resistant, hard layer of an adhesive or bonding agent which is provided by melting between profiled blocks of the core material; the bonding agent may be glass having the correct thickness for the desired gap length. This method is shown in U.S. Patent 3,024,318, assigned to the assignee of the instant invention. This method, in which finally a front circuit, i.e. a pole piece including the useful gap, is permanently secured to a rear circuit or closing piece, has a few structural advantages over the method described above with exchangeable pole pieces; for example, a suitable, non-magnetic stiffening body can be provided in the annular-shaped, profiled space behind the useful gap in order to hold together the two core portions of the front circuit, this being considerably cheaper than the use of holders. Also, a plurality of front circuits can be obtained by sawing them from the same assembly of blocks, if the circuit has lateral dimensions larger than is required for the width of one track. From the viewpoint of mass production, however, this methods presents the following prohibitive objections: the profiling of the various portions of the front circuit requires a plurality of costly operations; the interposition of the gap material by melting involves an accurate fixation of the profiled blocks to each other at high temperatures, for example, of 800° C., and can be achieved only by expensive jigs; from each sealed set of blocks, in which the correct gap length can be obtained only at high costs owing to the high operating temperatures, only a comparatively small number of individual pole pieces can be severed in view of the necessarily fairly large, annular-shaped space and of the relative external dimensions of the pole pieces, as compared with the gap height, so that expensive pole pieces are involved; also, the stiffening body in the annular-shaped space and the arrangement thereof involve additional costs.

The method according to the invention provides the possibility of manufacturing magnetic heads in mass production in an extremely efficacious manner, while at the same time fulfilling the severest technical requirements with respect to durability and resolving power for small wavelengths; according to one aspect of the invention, a shape different from the conventional one is used for the foremost part of the heads, resulting in a saving of material and a reduction in the number of required, accurate and hence costly mechanical operations; moreover, in a pre-manufacturing stage a very great number of magnetic heads can be manufactured at the same time. In the method according to the invention the starting material is formed by two or more fairly arbitrarily shaped blocks of sintered ferromagnetic oxide material, which are not profiled at least on the sides to be arranged opposite each other; these sides are united to form a mechanical unit throughout the whole surface with the aid of an adhesive or bonding agent which determines the gap; from the resulting assembly a large number of individual or composite poleshoe pieces can be severed mechanically, for example, by sawing, since the surface of the said sides has dimensions which are many times the dimensions of the gap surface of an individual poleshoe piece (in this case the poleshoe unit), both in the direction of the gap height and in that of the gap width (corresponding with the track width). The poleshoes of each unit therefore adhere to each other only by means of the gap-building adhesive; it has been found that this adhesion is mechanically sufficiently strong as long as the sectional areas of the unit parallel to the gap surface do not exhibit excessively great discrepancies in dimensions.

Although the poleshoe units may be severed from the body in any desired shape, it is advantageous to sever them in the form of flat plates, since in this case the loss of material is minimized and furthermore since such flat plates have the optimum mechanical resistance to further machining. In the simplest case a poleshoe unit can be severed in this manner which has a gap width at least equal to the width of the magnetic track. This applies to the case in which only two blocks of magnetic material are used. The thickness of the poleshoe unit (corresponding to the coarse size of the gap height) is determined by the geometrical shape of the final head (head length, radius of curvature and definite gap height) and may be only 1 mm., for example, for non-professional heads, so that from a set of two blocks a few tens of poleshoe units can be obtained.

However, if for example three blocks of magnetic material are used, poleshoe units having two gaps lying one after the other are obtained in the simplest case; for most uses these gaps are to extend parallel to each other. The opposite gap surfaces of each individual gap are to be machined to accurate flatness and are to be oriented parallel to each other.

Magnetic heads having two relatively parallel gaps lying one after the other may be employed for special uses. One gap may be used for example as a recording gap and the other as a scanning gap, each gap constituting a magnetic circuit with a closing piece provided with windings. These closing pieces may be relatively separated (for example two U-shaped yokes) or may be combined, for example, in the form of an M-shaped yoke, so that the recording head and the scanning head are combined in a single magnetic head; this may be advantageous when recording pulses in that the recorded signal can be checked immediately after recording. Such a combination may also be required, when the head is to be used in conjunction with a magnetic record carrier moving at a very low speed (for example 5 cms. per second) and when a considerable frequency band is to be recorded (for example up to 15 kc./s.). With these requirements it is no longer possible to compromise between the relatively opposing requirements with respect to the gap lengths of the recording gap and the scanning gap. This scanning gap length is to be sufficiently smaller, for example at least a factor 2, than the shortest recorded wavelength, which in the present example is about $3\mu$, whereas the recording gap length is preferably to be at least $10\mu$ in order to ensure a satisfactory recording on the carrier throughout the depth of the magnetic layer, particularly when recording long wavelengths. In a given embodiment the gap lengths may be, for example, 2 and $20\mu$, for the scanning gap and the recording gap respectively, the gaps being spaced apart by a distance of for example 5 mms. and are parallel to each other with a tolerance of, at the most, half a scanning gap length (i.e. $1\mu$) throughout the track width of for example 6 mms. Such a precision cannot be obtained in an economical manner by mechanical orientation of two individual heads. The poleshoe structures according to the invention, however, fulfil these severe requirements with all heads in a comparatively simple manner, since the central block is machined to a planoparallel shape.

The method according to the invention may also be used advantageously in those cases in which adjacent magnetic heads with accurately aligned gaps of precisely the same length are to be combined. Such heads are employed for example, for stereophonic purposes or for recording of data in adjacent tracks; these applications require the alignment of the gaps in order to fulfil the condition of the exchangeability in different reproducing apparatus of magnetic record carriers having records in which the information of the various tracks is correlated.

In accordance with the invention the manufacture of magnetic heads, in which use is made of the poleshoe pieces obtained by the method outlined above, is carried out, in connection with the foregoing, by severing the poleshoe pieces in the form of flat plates from the body formed by the blocks, after which the poleshoe pieces are arranged as a unit on a closing piece or as a whole as a poleshoe plate on a plurality of adjacent closing pieces, spaced apart by a certain distance; in the latter case, after the material has been cast in between the individual circuits, a separation is provided, for example, by sawing, in the material of the poleshoe plate, in a manner such that in the first case a single-track magnetic head and in the second case a multi-track magnetic head is obtained, having a plurality of individual, coherent, but magnetically separated circuits, the number of which corresponds with the number of closing pieces.

It should be noted that the method described for manufacturing magnetic heads having parallel gaps lying one after the other and those having adjacent aligned gaps may be readily combined to obtain, with the aid of a single poleshoe plate, multitrack magnetic heads consisting of a plurality of adjacent circuits, each having two magnetic subcircuits lying one after the other, i.e. two relatively parallel gaps. Such a multi-track head may be used, for example, for recording and reproducing stereophonic signals with a low speed of the record carrier.

Single-track or multi-track magnetic heads comprising thin, plate-shaped poleshoe pieces, which have the desired radius of curvature achieved by polishing, may be employed advantageously particularly in cases in which the head is in contact with a comparatively slowly moving record carrier. In certain professional uses, in which high speeds of the record carrier are common practice, the radius of curvature of the running surface of the head is designed to be sufficiently small to ensure a gradual increase in the distance between the tape and the head towards the edges of the head; this is done to avoid irregularities in the frequency characteristic curve of the head for wavelengths corresponding to the head length. With a given length of the head a smaller radius of curvature requires thicker plate-shaped poleshoe pieces. While this involves the comparatively slight disadvantage of a greater loss of material due to these thicker poleshoe pieces there is the advantage of a greater mechanical resistance without the use of stiffening bodies or holders; this permits a further simplification in various stages of the manufacture and composition of the magnetic heads since any required grooves and shapes in the poleshoe pieces may be provided in an extremely economical manner simultaneously in a great number of poleshoe pieces during the stage before or after the separation of the poleshoe pieces from the larger blocks and prior to the mounting on the corresponding closing pieces.

According to a further aspect of the invention, particularly when using the thick plate-shaped poleshoe pieces, in order to obtain the desired small radius of curvature of the running surface and to ensure a sufficiently small gap height without the need for providing a complicated shaping of the poleshoe prior to the application of the gap adhesive, a groove can be provided in the poleshoe pieces before they are arranged on the closing pieces, this groove being provided in the surface facing the closing pieces at the area of the gap surface. Apart from the aforesaid advantages this method has an additional advantage in that, since the gap surface is accurately limited on the bottom side by the shape of the groove, the final gap height may be chosen smaller than is possible with the always slightly inaccurate relative fixation of two shaped parts; also, magnetic stray with a groove-shaped space is more favourable than with an annular-shaped space; these two factors improve the efficiency of the magnetic head and, particularly with greater numbers of magnetic heads, the differences in properties are smaller and hence the loss percentage is lower.

The same method may be extended to the case in which the magnetic head has two gaps lying one after the other, by providing the poleshoe piece provided with two gaps at the area of each gap surface with the said groove.

In order to restrict cross talk between the various individual circuits of the multi-track magnetic head according to the invention, provided with either comparatively thin or thick poleshoe plates, the closing pieces may be spaced apart by an adequate distance; however, this would involve an inefficient use of tape and of poleshoe material. Alternatively, magnetic screening plates may be provided between the closing plates prior to the casting operation. In the gap between the poleshoe pieces there may also be arranged afterwards separate screening plates.

According to a further aspect of the invention the relative screening of the individual magnetic circuits may be obtained in a simpler manner by providing a screening plate between the closing pieces during the manufacture of multi-track magnetic heads comprising a plurality of individual circuits screened relatively from each other by means of magnetic material, intended for use in conjunction with a plurality of parallel tracks of a magnetic record carrier, and by carrying out the separation between the pole-shoe units so that part of the material of the poleshoe plate located in line with the screening plate between the closing pieces is maintained.

Particularly when using thicker poleshoe units it is also in accordance with a further aspect of the method of manufacturing multi-track magnetic heads comprising a plurality of individual circuits screened from each other by magnetic material, intended for use in conjunction with a corresponding number of parallel record tracks, to provide grooves (transverse to the gap surface) in the surface of the poleshoe plates to be arranged opposite the closing piece at the area where the closing pieces are separated from each other, the depth of the groove being slightly greater than the finally desired gap height; after this, screening plates are arranged in these grooves, which plates extend at least throughout the surface of the individual closing pieces; after the casting operation, the top surface of the poleshoe units is polished so that poleshoe-plate material is left only at the area of the closing pieces. By providing grooves the screening plates may be arranged between the individual magnetic circuits prior to casting; the sawing operation to separate the various magnetic circuits, after casting, can be completely dispensed with.

It should be noted that the methods described in which an adequately small gap height with a small radius of curvature of the running surface of a magnetic head is obtained by providing a transverse groove at the area of the gap surface and in which screenings are obtained between adjacent, individual heads in the case of multi-heads by providing longitudinal grooves, may be combined by starting, in the case of a multi-head, from a poleshoe plate, of which the surface to be facing the closing piece is provided with relatively normal grooves during a preceding stage.

According to a further aspect a further simplification of the assembly of magnetic heads may be obtained by providing, before a poleshoe piece is united with a closing piece, special shapes in the poleshoe units to obtain a simpler and at the same time more rigid fastening of the unit concerned to the closing piece; also, any special fastening means may be simultaneously fixed by casting. The shapings referred to above may be filled with cast resin or they may serve as fastening areas for the ends of brackets of resilient material.

The invention will be described more fully with reference to a few embodiments shown in the accompanying drawing, wherein:

FIGURE 1 also shows a poleshoe unit manufactured by this method and a closing piece provided with windings to complete the magnetic circuit.

Figure 1:
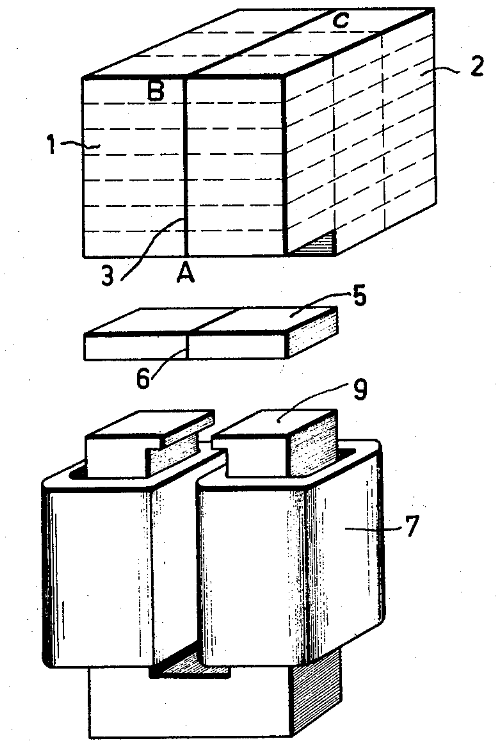
FIG. 1 shows in a perspective view two blocks of sintered oxidic ferro-magnetic material which are joined to each other by means of a layer of an adhesive forming the gap, the blocks being the starting material for the method of the invention.

Referring to FIG. 1, reference numerals 1 and 2 designate each a block of sintered oxidic ferro-magnetic material, which enclose together between two accurately machined flat surfaces ABC a parallel useful gap 3 which is filled with a non-magnetic adhesive, the latter being provided in a preceding stage by arranging it in the form of a foil between the blocks and by compressing the blocks at a temperature exceeding the melting point or the softening point of the adhesive at a pressure such that, after cooling, the correct gap length is obtained. In the method according to the invention the manufacture of the complex body starts from two comparatively arbitrarily shaped blocks of ferro-magnetic material, of which the gap surfaces to be obtained are not profiled; these blocks are joined to each other, with parallel useful gaps being formed between them and a mechanical unit thus obtained. From such a complex body flat pieces in the form of separate poleshoe units, for example, the separately shown poleshoe unit 5, or in the form of poleshoe plates can be severed along the broken lines in the figure. By adding to the poleshoe unit 5 a closing piece 9, provided with windings 7, a complete magnetic circuit is obtained in a simple manner.

Figure 2:
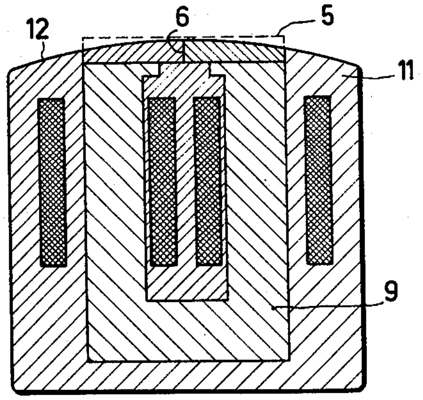
FIG. 2 shows a cross sectional view of a complete magnetic circuit obtained by the method.

This is more fully shown in FIG. 2; the poleshoe unit 5 is fastened to the closing piece 9 by fixing all components with the aid of cast resin 11. The top surface of the head and hence that of the poleshoe unit is then polished to a roundness such as to obtain the desired height of the gap 6 and the desired rounding-off of the head, designated by the line 12, serving as a running surface for the record carrier.

Figures 3, 4:
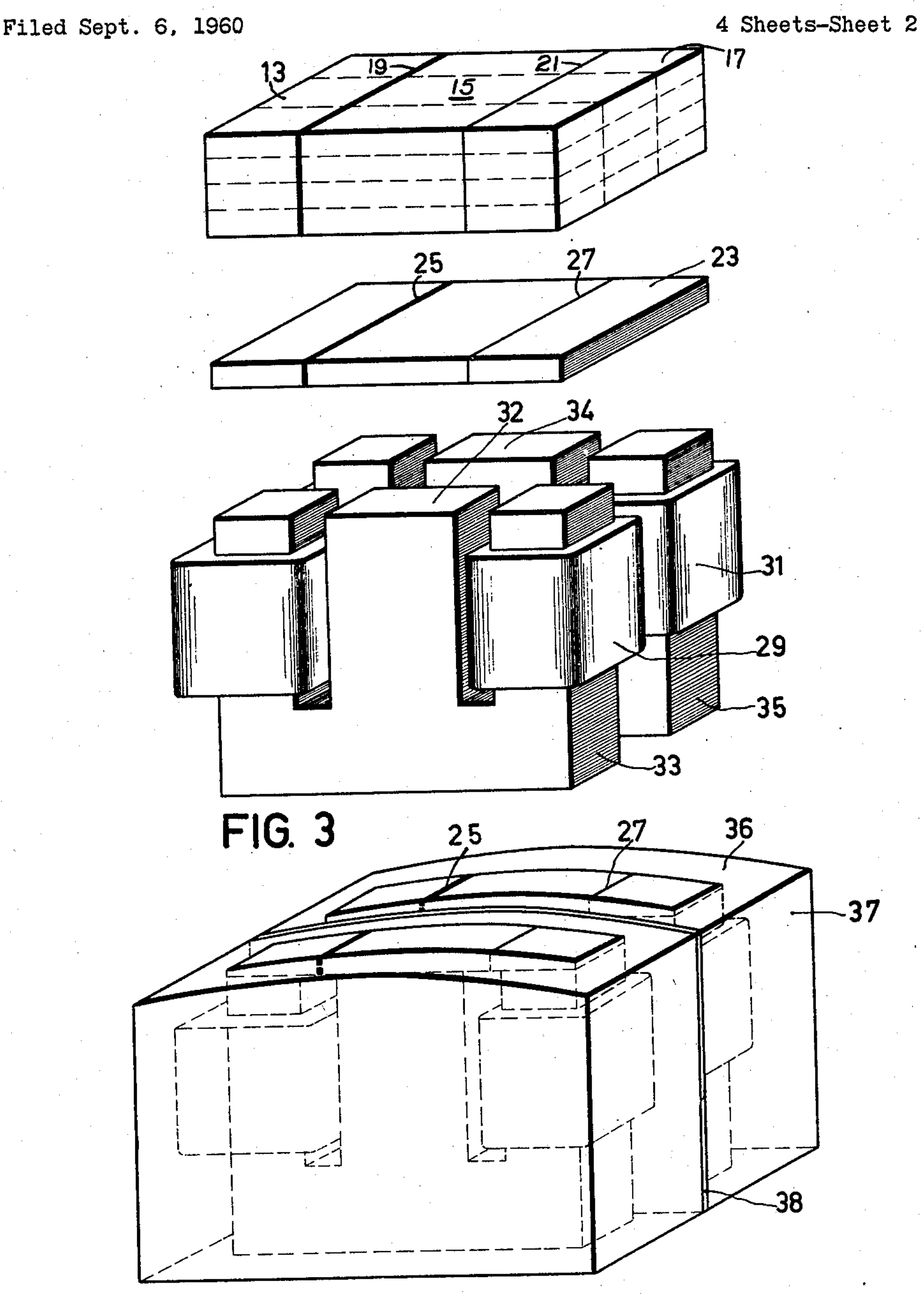
FIGS. 3 and 4 are perspective views of the parts shown in FIGS. 1 and 2, the starting material being, however, three blocks of sintered oxidic ferro-magnetic material.

The manufacture shown in FIG. 3 for poleshoe units or plates starts from three blocks of sintered oxidic ferro-magnetic material 13, 15, 17. Between the blocks 13 and 15 there is provided the gap 19 and between the blocks 15 and 17 the gap 21. When the said blocks with the interposition of the adhesive layers forming the gaps 19 and 21 are joined with each other, the separate poleshoe units can be severed along the broken lines indicated in the figure.

In order to obtain multi-track magnetic heads the said body may, however, also be divided along the broken, horizontal lines, into poleshoe plates. Such a plate is designated by 23; reference numeral 25 designates a recording gap and 27 a scanning gap. From the figure it is clearly evident that the length of the recording gap 25 is many times larger than that of the scanning gap 27. In practice these lengths may amount to 20 and $2/\mu$ respectively, so that a magnetic head provided with such gaps is extremely suitable for use in conjunction with a magnetic record carrier moved at low speed.

The aforesaid poleshoe plate 23 is positioned, as a whole, on the closing pieces 33 and 35, arranged in a jig (not shown) and provided with windings 29 and 31 respectively; these pieces are provided with an intermediate piece 32 and 34 respectively. The connection between the poleshoe plate 23 and the closing pieces 33 and 35 is established by fixing the assembly with the aid of a cast resin 37 (see FIG. 4). In order to separate the two magnetic circuits, the material of the poleshoe plate located between the two circuits, after the casting operation, may be removed by mechanical means, for example by sawing, after which the top surface of the magnetic head is rounded off by polishing so that the desired height of the gaps 25 and 27 and the desired curvature of the top surface of the head, serving as a running surface 36 for the magnetic record carrier, are obtained.

Thus a magetic head is obtained as is shown diagrammatically in FIG. 4; it is suitable for recording or scanning for example two stereophonically associated tracks of a magnetic record carrier, which is moved with low speed. In the magnetic head shown in the figure, between the two magnetic circuits, there is furthermore arranged a screening plate 38 to restrict cross-talk. The manner in which this plate is arranged, prior to the casting operation, between the two circuits will be set out more fully hereinafter in dealing with the manufacture of multi-track, single-gap magnetic heads.

Figure 5:
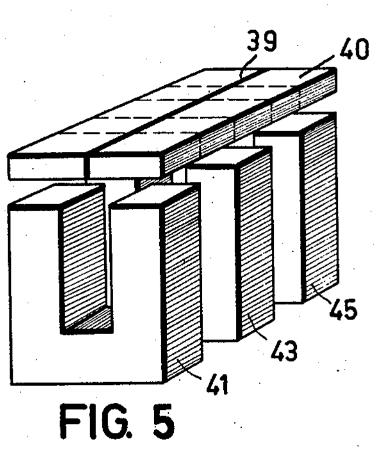
FIGS. 5, 6, 7 and 8 show multi-track magnetic heads obtained by the method of the invention

FIG. 5 will first be considered, which shows a structure in which screening plates may be dispensed with. In the manner shown in FIG. 3 the structure of a magnetic head is shown for recording on or reproducing from a plurality of adjacent tracks on a magnetic record carrier; however, instead of two gaps lying one after the other, only one gap is provided for each track. In order to obtain a multi-track magnetic head a poleshoe plate 40, provided with a gap 39, is arranged, for example, on three closing pieces 41, 43 and 45, arranged in a jig (not shown). The closing pieces are spaced apart by a distance such that cross-talk between the various magnetic circuits is minimized. In this case no magnetic screening plates need be arranged, it is true, between the individual magnetic circuits, but this implies an inefficient use of the magnetic record carrier and of the poleshoe material. Under the aforesaid conditions, when the screening plates are omitted, it may suffice to fix the pole plates and the closing pieces together by casting resin, after which a separation is to be made in the material of the poleshoe plate between the individual circuits, while the head surface of the head is to be polished to a roundness such that the desired gap height and the desired rounding-off is obtained.

Figure 6:
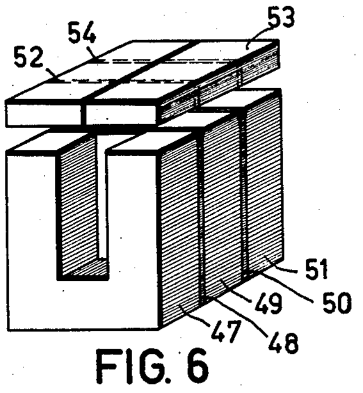

FIG. 6 shows the structure of a multi-track magnetic head, in which the tape and the poleshoe material are used with greater efficiency, since in this case the closing pieces are arranged much more closely to each other in the jig (not shown). In order to restrict cross-talk between the individual magnetic circuits it is necessary to provide between them magnetic screenings. To this end a magnetic screening plate 48 and 50 is provided in the narrow interstices between the closing pieces 47, 49 and 49, 51 respectively. These plates, however, do not extend beyond the lower sides of the pole plate 53. Consequently, when after casting, the separation between the individual magnetic circuits has been made by making for example a saw cut in the material located between the circuits, an additional screening plate may be arranged in the slot of 52 and 54. However, it is more efficacious, in accordance with the method, to carry out the said separation so that part of the material of the poleshoe plate in line with the prolongation of the screening plate is maintained.

Figure 7:
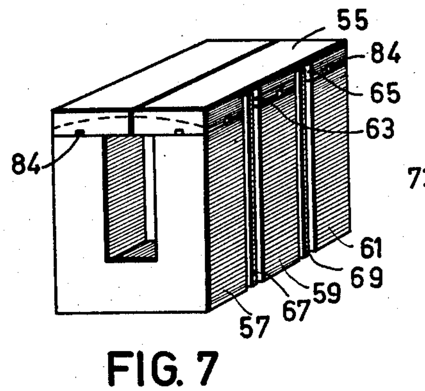

FIG. 7 shows a structure of a multi-track magnetic head, in which grooves 63 and 65 are provided in the poleshoe plate 55, before it is arranged on the closing pieces 57, 59 and 61, in the surface to be facing the closing pieces where the closing pieces are separated from each other. Thus a magnetic screening plate 67 can be arranged in the intermediate space formed between the groove 63 and the closing pieces 57 and 59, which plate extends not only throughout the side surfaces of the closing pieces but also between the poleshoe units of the poleshoe plate separated subsequently by the rounding off effect of the polishing operation. After the assembly has been fixed by casting resin, it suffices to polish the head surface to a roundness such that the desired gap height and the desired radius of curvature are obtained. Since in accordance with the method the depth of the grooves 63 and 65 has been chosen slightly larger than the finally desired gap height, the screening plates 67 and 69 will be limited by the running surface of the magnetic head after the head has been polished to the desired roundness. When the grooves are provided previously, the arrangement of the magnetic screening need no longer be carried out in two stages and moreover, sawing of the poleshoe plate is dispensed with, since the polishing operation subsequent to the casting operation provides automatically the required separation between the varous poloshoe units of the poleshoe plate.

So far the manufacture of single-track or multi-track magnetic heads starting from poleshoe units or plates of a comparatively small thickness, for example, of 1 mm. for non-professional use, since a comparatively small rounding-off or a large radius of curvature suffices, has been dealt with. With the single-track or multi-track magnetic heads for profressional uses the requirements are, in general, much more sever, particularly with respect to the radius of curvature, which is to be much smaller. This means that the manufacture has to start from thicker poleshoe units or plates (of, for example, 4 mms.). In order to maintain, nevertheless, a small gap height, which could practically no longer be obtained in the final manufacturing stage of the head, a groove 73 is arranged in the poleshoe units, as is indicated in FIG. 8 for the poleshoe plate 71, this groove being provided in the surface to be facing the closing pieces 74, 76 at the area of the gap surface 77.

Figure 8:
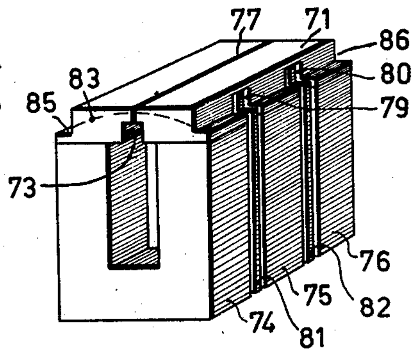

The structure of the multi-track head shown in FIGURE 8 has furthermore two grooves 79 and 80 which are provided in the poleshoe plate in order to facilitate the arrangement of screening plates as in the structure shown in FIG. 7; these screening plates are designated by 81 and 82. After the assembly has been fixed by casting resin, the head surface of the poleshoe plate 71 is polished to roundness in a conventional manner until the desired gap height and the desired radius of curvature are obtained. The imaginary radius of curvature is indicated in the figure by the broken line 83; since in this case a thicker poleshoe plate is used than in the preceding structure, this radius may be accordingly smaller. After polishing a separation in the poleshoe material between the various magnetic circuits is again automatically obtained and the magnetic screening plates extend again at least throughout the side surfaces of the magnetic circuits, the top side of each screening plate touching the magnetic record carrier, when the latter is moved along the running surface of the magnetic head obtained by polishing.

In all the aforesaid structure polishing takes place subsequent to the arrangement of the poleshoe unit or plate on the corresponding closing pieces, so that this process is to be carried out separately for individual single-track or multi-track magnetic heads. In practice the required gap height is checked during the polishing process; this may be done by electrical inductance measurement. An alternative method of machining the running surface consists in that the poleshoe units or plates are polished to roundness before they are arranged on the corresponding closing pieces, which process can be carried out simultaneously for a great number of these units or plates. It is then, however, no longer possible to check the required gap height by electrical means; these gap heights have to correspond with low tolerances to accurate mechanical measures.

With all structures described above the poleshoe pieces are fixed to the associated closing pieces by fixing the said parts in a cast resin; the general tendency is to avoid layers of cast resin between the contact surfaces of these parts, since such a layer, which occurs twice in each head circuit, contributes to an increase in reluctance of the circuit portion surrounded by the winding; with respect to the desired efficiency of the head the said reluctance should be sufficiently low as compared with the reluctance of the useful gap. If this casting process does not give a satisfactory mechanically resistant fixation of the poleshoe units or plates on the associated closing pieces, fine channels 84 (FIG. 7) may be provided in the surface to be facing the closing pieces; together these channels comprise, for example, not more than 10% of the total contact surface and during the casting process they are filled with cast resin, so that they contribute to a higher mechanical rigidity of the assembly. As a matter of course, such channels may, as an alternative, be arranged in the contact surfaces of the closing pieces instead of in the poleshoe pieces.

FIG. 8 illustrates a further method of fastening, which may be used advantageously, since in this structure thicker poleshoe plates are employed. To this end two grooves 85 and 86 are provided in the side of the pole plate 71, parallel to the gap surface 77; the ends of a resilient clamping bracket 87 (FIG. 9) are adapted to engage these grooves.

Figure 9:
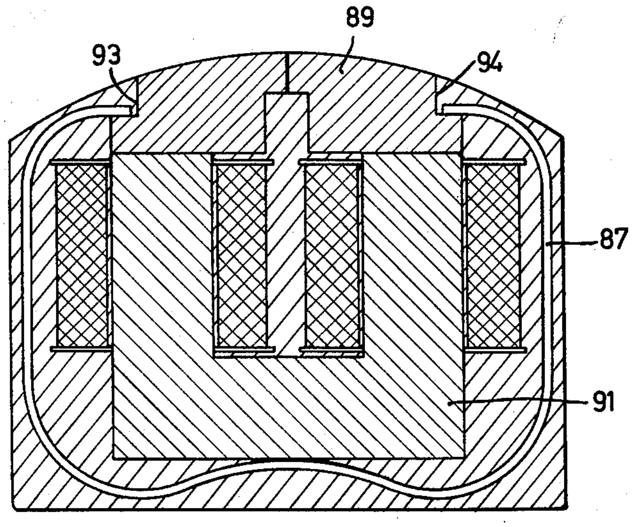
FIGS. 9 and 10 illustrate a method of fastening the poleshoe piece to the closing piece.

FIG. 9 is a sectional view of a magnetic head in which the grooves to engage the ends of the clamping bracket 87 are designated by 93 and 94. The clamping bracket grips around the poleshoe plate 89 and the closing piece 91 so that the center of the bracket engages just the bottom side of the closing piece 91.

Figure 10:
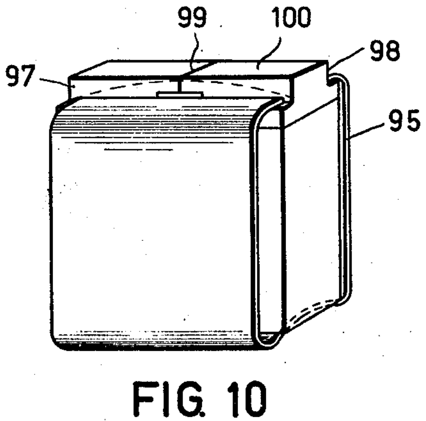

FIG. 10 illustrates a further method of fastening with the aid of a clamping bracket. The grooves to engage the bracket do not extend parallel to the gap surface, but at right angles thereto. This has the advantage that in contradistinction to the structures shown in FIGS. 8 and 9, when the assembly of the poleshoe plate and the closing pieces inclusive of the clamping bracket is fixed by the casting process, the polishing process on the top surface of the magnetic head is not hindered by the ends of the clamping bracket. Moreover, since the clamping bracket 95 engages with its ends the grooves 97 and 98, it does not exert bending stress on the gap 99 of the poleshoe plate 100, also in contradistinction to the structures shown in FIGS. 8 and 9.

It should be noted that the provision of the various kinds of grooves in the aforesaid poleshoe units or plates, which grooves are not located in the surface to be facing the closing piece, should be carried out preferably in the stage following the separation of the said units from the large blocks and preceding the fixation of the bodies to the associated closing pieces, since this process can then be economically carried out simultaneously with a great number of these units and plates.

While various specific embodiments have been described, it will be apparent to those skilled in the art that many modifications and variations may be made without departing from the inventive concept, the scope of which is set forth in the appended claims.

What is claimed is:

1. A method of manufacturing a plurality of poleshoes for magnetic heads comprising: machining to substantial flatness at least one surface of each of at least two solid blocks of sintered oxidic ferromagnetic material whose dimensions are a multiple of said poleshoes both laterally and vertically, arranging said surfaces parallel to and opposite each other, interposing an adhesive layer of heat-softenable and bondable material between opposing surfaces, heating said assembly to soften said adhesive layer, applying opposing forces to said blocks to deform said adhesive and continuing to apply such force until the desired gap length is obtained, discontinuing the application of such force to permit said adhesive to harden and maintain said blocks so positioned, thus forming a poleshoe unit wherein said blocks are mechanically bonded to each other at said surfaces by said adhesive layer, said adhesive layer forming the gap material of the poleshoes, and severing from said unit a plurality of poleshoes each containing at least one gap portion, said severing being done in planes substantially perpendicular to the plane of said surfaces.

2. A method of manufacturing a plurality of magnetic heads comprising: machining to substantial flatness at least one surface of each of a plurality of solid blocks of sintered oxidic ferromagnetic material whose dimensions are a multiple of the poleshoes of said heads both laterally and vertically, arranging said surfaces parallel to and opposite each other, each pair of opposing surfaces defining a gap portion, interposing an adhesive layer of heat-softenable and bondable material between opposing surfaces, heating said assembly to soften said adhesive layer, applying opposing forces to said blocks to deform said adhesive and continuing to apply such force until the desired gap length is obtained, discontinuing the application of such force to permit said adhesive to harden and maintain said blocks so positioned, thus forming a poleshoe unit wherein said blocks are mechanically bonded to each other at said surfaces by said adhesive layer, said adhesive layer forming the gap material of the poleshoes, severing from said unit a plurality of poleshoes in the form of flat plates, each containing at least two gap portions parallel to and spaced from each other, said severing being done in planes substantially perpendicular to the plane of said surfaces, and placing each flat plate on a closing piece comprising a magnetic core having a plurality of legs and coils inductively coupled therewith, each gap portion extending transversely across said closing piece between one pair of legs.

3. A method as claimed in claim 2, wherein each flat plate contains two gap portions, one of said gap portions being wider than the other.

4. A method of manufacturing a plurality of multitrack magnetic heads comprising: machining to substantial flatness at least one surface of each of at least two solid blocks of sintered oxidic ferromagnetic material whose dimensions are a multiple of the poleshoes of said heads both laterally and vertically, arranging said surfaces parallel to and opposite each other, interposing an adhesive layer of heat-softenable and bondable material between opposing surfaces, heating said assembly to soften said adhesive layer, applying opposing forces to said blocks to deform said adhesive and continuing to apply such force until the desired gap length is obtained, discontinuing the application of such force to permit said adhesive to harden and maintain said blocks so positioned, thus forming a poleshoe unit wherein said blocks are mechanically bonded to each other at said surfaces by said adhesive layer, said adhesive layer forming the gap material of the poleshoes, severing from said unit a plurality of poleshoes in the form of flat plates, each containing at least one gap portion, said severing being done in planes substantially perpendicular to the plane of said surfaces, placing adjacent to each other a plurality of closing pieces each comprising a magnetic core having a plurality of legs and coils inductively coupled therewith, and placing a selected flat plate on said plurality of closing pieces, each gap portion extending transversely across said closing pieces between pairs of said legs.

5. A method of manufacturing a plurality of multitrack magnetic heads comprising: machining to substantial flatness one surface of each of two solid blocks of sintered oxidic ferromagnetic material and two surfaces of a third such block, placing said third block between said first two blocks with the machined surfaces of said third block facing and being parallel to the machined surfaces of said two blocks, respectively, interposing an adhesive layer between facing surfaces thus forming a poleshoe unit wherein said blocks are mechanically bonded to each other at said surfaces by said adhesive layers, said adhesive layer forming the gap material of the poleshoes, severing from said unit a plurality of poleshoes in the form of flat plates, each containing two gap portions, said severing being done in planes substantially perpendicular to the plane of said surfaces, placing adjacent to each other a plurality of closing pieces each comprising an inner leg and two outer legs of magnetic core material and coils inductively coupled with said outer legs, and placing a selected flat plate on said plurality of closing pieces, each gap portion extending transversely across said closing pieces between said inner leg and one of said outer legs.

6. A method as claimed in claim 5, wherein one of said gap portions is wider than the other.

7. A method of manufacturing a plurality of multi-track magnetic heads comprising: machining to substantial flatness one surface of each of at least two solid blocks of sintered oxidic ferromagnetic material, arranging said surfaces parallel to and opposite each other, interposing an adhesive layer between opposing surfaces thus forming a poleshoe unit wherein said blocks are mechanically bonded to each other at said surfaces by said adhesive layer, said adhesive layer forming the gap material of the poleshoes, severing from said unit a plurality of poleshoes in the form of flat plates, each containing at least one gap portion, said severing being done in planes substantially perpendicular to the plane of said surfaces, placing adjacent to each other a plurality of closing pieces each comprising a magnetic core having a plurality of legs and coils inductively coupled therewith, placing a selected flat plate on said plurality of closing pieces, each gap portion extending transversely across said closing pieces between pairs of said legs, fixing the resultant assembly in cast resin, and dividing said flat plate by cutting it in the areas between said closing pieces in a direction transverse to said gap portions.

8. A method of manufacturing a plurality of multi-track magnetic heads comprising: machining to substantial flatness one surface of each of at least two solid blocks of sintered oxidic ferromagnetic material, arranging said surfaces parallel to and opposite each other, interposing an adhesive layer between opposing surfaces thus forming a poleshoe unit wherein said blocks are mechanically bonded to each other at said surfaces by said adhesive layer, said adhesive layer forming the gap material of the poleshoes, severing from said unit a plurality of poleshoes in the form of flat plates, each containing at least one gap portion, said severing being done in planes substantially perpendicular to the plane of said surfaces, placing adjacent to each other a plurality of closing pieces each comprising a magnetic core having a plurality of legs and coils inductively coupled therewith, placing first magnetic screens between each adjacent pair of closing pieces, placing a selected flat plate on said closing pieces and magnetic screens, each gap portion extending transversely across said closing pieces between pairs of said legs, fixing the resultant assembly in cast resin, dividing said flat plate by cutting it in the areas at said first magnetic screens in a direction transverse to said gap portions, and placing second magnetic screens in the cut-out portions of said flat plate.

9. A method as set forth in claim 8 in which grooves are formed in the flat plates, said grooves extending in the same direction as the gap portions, prior to placing the plates on the closing pieces.

10. A method of manufacturing a plurality of multi-track magnetic heads comprising: machining to substantial flatness one surface of each of at least two solid blocks of sintered oxidic ferromagnetic material, arranging said surfaces parallel to and opposite each other, interposing an adhesive layer between opposing surfaces thus forming a poleshoe unit wherein said blocks are mechanically bonded to each other at said surfaces by said adhesive layer, said adhesive layer forming the gap material of the poleshoes, severing from said unit a plurality of poleshoes in the form of flat plates, each containing at least one gap portion, said severing being done in planes substantially perpendicular to the plane of said surfaces, cutting grooves in the bottom surfaces of said flat plates, said grooves being transverse to the direction of said gap portion, placing adjacent to each other a plurality of closing pieces each comprising a magnetic core having a plurality of legs and coils inductively coupled therewith, placing magnetic screens between each adjacent pair of closing pieces, placing a selected flat plate with its bottom surface on said closing pieces and magnetic screens, each gap portion extending transversely across said closing pieces between pairs of said legs with each groove being in line with a magnetic screen which extends into said groove, and fixing the resultant assembly in cast resin.

11. A method as set forth in claim 10 in which second grooves are formed in the flat plates, said second grooves extending in the same direction as the gap portions, prior to placing the plates on the closing pieces.

12. A method of manufacturing a plurality of multi-track magnetic heads comprising: machining to substantial flatness one surface of each of at least two solid blocks of sintered oxidic ferromagnetic material whose dimensions are a multiple of the poleshoes of said heads both laterally and vertically, arranging said surfaces parallel to and opposite each other, interposing an adhesive layer of heat-softenable and bondable material between opposing surfaces, heating said assembly to soften said adhesive layer, applying opposing forces to said blocks to deform said adhesive and continuing to apply such force until the desired gap length is obtained, discontinuing the application of such force to permit said adhesive to harden and maintain said blocks so positioned, thus forming a poleshoe unit wherein said blocks are mechanically bonded to each other at said surfaces by said adhesive layer, said adhesive layer forming the gap material of the poleshoes, severing from said unit a plurality of poleshoes in the form of flat plates, each containing at least one gap portion, said severing being done in planes substantially perpendicular to the plane of said surfaces, placing adjacent to each other a plurality of closing pieces each comprising a magnetic core having a plurality of legs and coils inductively coupled therewith, cutting rectangular grooves into the top end edges of said plates, said grooves extending in the same direction as said gap portions, placing a selected flat plate on said plurality of closing pieces, each gap portion extending transversely across said closing pieces between pairs of said legs, placing a clamping bracket extending around said grooves and said closing pieces, and fixing the resultant assembly in cast resin.

13. A method of manufacturing a plurality of poleshoes for magnetic heads comprising: machining to substantial flatness at least one surface of each of at least two solid blocks of sintered oxidic ferromagnetic material whose dimensions are a multiple of said poleshoes both laterally and vertically, arranging said surfaces parallel to and opposite each other, interposing an adhesive layer of heat-softenable and bondable material between opposing surfaces, heating said assembly to soften said adhesive layer, applying opposing forces to said blocks to deform said adhesive and continuing to apply such force until the desired gap length is obtained, discontinuing the application of such force to permit said adhesive to harden and maintain said blocks so positioned, thus forming a poleshoe unit wherein said blocks are mechanically bonded to each other at said surfaces by said adhesive layer, said adhesive layer forming the gap material of the poleshoes, and severing from said unit a plurality of poleshoes each containing at least one gap portion, said severing being done in two mutually perpendicular planes, each of said planes being substantially perpendicular to the plane of said surfaces.

14. A method of manufacturing a magnetic head, comprising: machining to substantial flatness one surface of each of two solid blocks of sintered oxidic ferromagnetic material whose dimensions are a multiple of the poleshoe of said head both laterally and vertically, arranging said surfaces parallel to and opposite each other, interposing an adhesive layer of heat-softenable and bondable material between said surfaces, heating said assembly to soften said adhesive layer, applying opposing forces to said blocks to deform said adhesive and continuing to apply such force until the desired gap length is obtained, discontinuing the application of such force to permit said adhesive to harden and maintain said blocks so positioned, thus forming a poleshoe unit wherein said blocks are mechanically bonded to each other at said surfaces by said adhesive layer, said adhesive layer forming the gap material of the poleshoes, severing from said unit at least one poleshoe in the form of a flat plate, each containing one gap portion, said severing being done in planes substantially perpendicular to the plane of the surfaces, and placing a selected flat plate on a closing piece comprising a magnetic core having two legs and coils inductively coupled therewith, said gap portion extending transversely between said two legs.

15. A method of manufacturing a plurality of multitrack magnetic heads comprising: machining to substantial flatness one surface of each of at least two solid blocks of sintered oxidic ferromagnetic material whose dimensions are a multiple of the poleshoes of said heads both laterally and vertically, arranging said surfaces parallel to and opposite each other, interposing an adhesive layer of heat-softenable and bondable material between opposing surfaces, heating said assembly to soften said adhesive layer, applying opposing forces to said blocks to deform said adhesive and continuing to apply such force until the desired gap length is obtained, discontinuing the application of such force to permit said adhesive to harden and maintain said blocks so positioned, thus forming a poleshoe unit wherein said blocks are mechanically bonded to each other at said surfaces by said adhesive layer, said adhesive layer forming the gap material of the poleshoes, severing from said unit a plurality of poleshoes in the form of flat plates, each containing at least one gap portion, said severing being done in planes substantially perpendicular to the plane of said surfaces, placing adjacent to each other a plurality of closing pieces each comprising a magnetic core having a plurality of legs and coils inductively coupled therewith, cutting rectangular grooves into the top end edges of said plates, said grooves extending in a direction transverse to said gap portions, placing a selected flat plate on said plurality of closing pieces, each gap portion extending transversely across said closing pieces between pairs of said legs, placing a clamping bracket extending around said grooves and said closing pieces, and fixing the resultant assembly in cast resin.

References Cited by the Examiner

UNITED STATES PATENTS

| | | | |
|---|---|---|---|
| 2,711,945 | 6/55 | Kornei | 179—100.2 |
| 2,735,901 | 2/56 | Coates et al. | 179—100.2 |
| 2,767,254 | 10/56 | Lafferty | 179—100.2 |
| 2,866,011 | 12/58 | Kornei | 179—100.2 |
| 2,897,286 | 7/59 | Atkinson et al. | 179—100.2 |
| 2,908,770 | 10/59 | Warren | 179—100.2 |
| 2,915,812 | 12/59 | Rettinger | 179—100.2 |
| 3,000,078 | 9/61 | Emenaker et al. | 179—100.2 X |
| 3,024,318 | 3/62 | Duinker et al. | 179—100.2 |
| 3,049,790 | 8/62 | Camras | 29—155.57 X |

FOREIGN PATENTS

| | | |
|---|---|---|
| 126,940 | 2/48 | Australia. |
| 1,028,968 | 3/53 | France. |

WHITMORE A. WILTZ, *Primary Examiner.*

NEDWIN BERGER, JOHN F. CAMPBELL, FRANK E. BAILEY, *Examiners.*